United States Patent Office 3,108,320
Patented Oct. 29, 1963

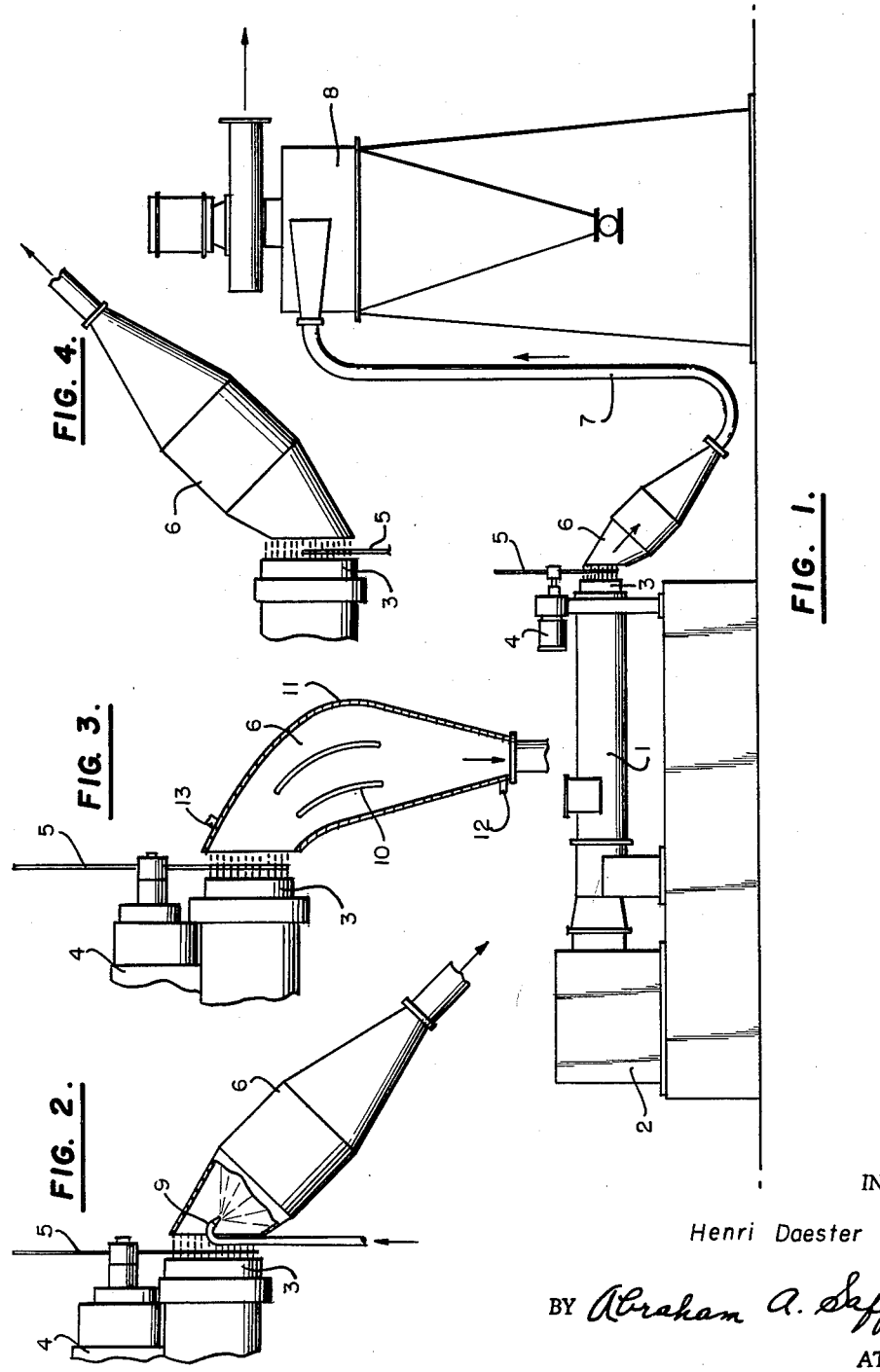

3,108,320
PROCESS AND APPARATUS FOR THE GRANULATION OF PLASTIC MASSES
Henri Daester, Hinterzweienweg 70, Muttenz, Basel, Switzerland
Filed Dec. 14, 1961, Ser. No. 159,254
Claims priority, application Switzerland Dec. 15, 1960
2 Claims. (Cl. 18—1)

The present invention relates to a process for the granulation of plastic masses, wherein the hot plastic granulate pre-formed through a nozzle is cut directly at the outer exit surface of the nozzle to the desired length, and to an arrangement for carrying out the process.

Among the known methods for the granulation of plastic masses, for example of thermo-plastic synthetic substances, granulation following upon a piston press or worm press plays a significant part. Here either the strands of material coming from the moulding nozzle are first cooled on a cooling path and then granulated by means of a cutting device in the cold, consolidated state, or the product issuing from the nozzle in the form of one or more strands with the granulate profile is cut directly in the warm state at the surface of the nozzle and cooled down with air or water only when it is in the form of the individual granulate particles. This cooling of the granulate particles from the plasticised warm state to the cold solid granulate grain takes place in a current of air or water.

A cooling installation without water, that is to say with air current, works with the present day technical means satisfactorily only in the case of a few products, for example polyvinylchloride. If these products possess adhesive properties, as is the case in other synthetic substances, such as polyethylene, polypropylene, polystyrene etc., hitherto satisfactory granulation in long term operation was not possible. In the case of these substances the cooling distance of the granulate particle in air is so great that the reception housing necessary for this purpose would achieve completely uneconomical dimensions.

For this reason after the direct cutting of the granulate at the surface of the nozzle the individual granulate particles are most frequently thrown into a water current. Thus an immediate quenching takes place at the surface, which prevents sticking of the granulate in further working. The main disadvantage of this method consists in that the granulate must first be separated from the water by means of a relatively expensive installation, usually a sieve, and then dried in an air current. Furthermore the water exerts a harmful influence upon many products.

The aim of the invention is a process and an arrangement for the granulation of plastic masses, wherein the above-described disadvantages are avoided. More especially it is to be made possible for even adhesive, difficult materials to be cooled satisfactorily after cutting of the granulate in the hot state on exit from the nozzle, without adhesion of the individual granulate grains to one another or blockage of the conduits by settlement of the granulate on the walls of the conduits occurring.

The process according to the invention consists in that the granulate is sucked away directly from the nozzle exit surface.

More expediently the granulate particles are drawn away by means of a flow of gas, the magnitude and direction of which are so selected that the granulate particles projected away by the cutting elements are deflected out of their direction of flight into the direction of the flow of gas.

It is also advantageous if the granulate particles are drawn away with a gas speed which lies in the region of the speed of flight of the granulate particles produced by the cutting blades, or somewhat higher than this speed.

The arrangement for carrying out the process comprises a moulding nozzle and cutting elements rotating before the latter, and is characterised in that after the moulding nozzle there is placed a suction nozzle for the sucking of the granulate particles. In most cases the axis of the suction nozzle is disposed approximately parallel with the direction of flight and the speed of the flow of gas lies in the region of the speed of flight of the granulate particles. If for reasons of space the axis of the suction nozzle is disposed obliquely of the direction of flight of the granulate particles, the latter will be deflected into the direction of flow from their direction of flight by the flow of gas.

Examples of embodiment of the object of the invention are illustrated in the accompanying drawings, wherein:

FIGURE 1 shows the overall layout of the arrangement,
FIGURE 2 shows a first embodiment of the reception nozzle in section,
FIGURE 3 shows a second embodiment of the reception nozzle, and
FIGURE 4 shows a cross-section through a reception nozzle with cutting arrangement acting from the bottom upwards.

According to the embodiment as shown in FIGURE 1 the arrangement possesses a piston or worm press 1, which is actuated by a motor 2. The press 1 is provided with a moulding nozzle 3. Before the moulding nozzle 3 there is arranged a cutting arrangement 5 driven by a motor 4, which arrangement granulates the strands of material issuing from the press. With the moulding nozzle 3 there is connected a reception or suction nozzle 6, in which there prevails a flow of air which carries away the granulate particles in accelerated fashion. The ratios are so selected that the speed of flow in the reception or suction nozzle 6 is sufficient for the deflection of the granulate particles out of the direction of flight into the direction of flow in the nozzle 6. The speed and direction of flight of the granulate particles are determined by the cutting arrangement 5.

The reception or suction nozzle 6 is connected through a conduit 7 with a cyclone 8, in which the granulate particles are separated off. Due to this construction the object is achieved that all the granulate particles projected away by the cutting arrangement are received and sucked away by the nozzle 6. The high speed of flow leads on the one hand to a very rapid cooling of the surface of the granulate and on the other hand prevents adhesion of the granulate to the walls.

In FIGURE 2 there is shown an embodiment wherein an atomisation nozzle 9 is present in the reception or suction nozzle 6. This embodiment is suitable for those products which must be cooled especially rapidly. Due to the use of an atomisation nozzle water is introduced directly into the suction or reception nozzle 6, the heat still present in the interior of the granulate particle sufficing for the revaporization of the water. This revaporization takes place in the travel of the granulate particle to the cyclone, where the parts are separated. In place of a nozzle 9 obviously it would also be possible for a plurality to be arranged one behind or one beside the other.

In the embodiment as shown in FIGURE 3 the reception or suction nozzle 6 is provided with baffles 10. These serve for the deflection of the air current and for the avoidance of eddy formation. Furthermore the reception or suction nozzle possesses a cooling jacket 11 which is equipped with water supply and discharge points 12 and 13 respectively. The baffles 10 can also be made with double walls and provided with a connection to a cooling liquid.

Finally in FIGURE 4 there is shown an embodiment of the arrangement wherein the reception or suction nozzle 6 is arranged above or laterally of the moulding nozzle 3, the direction of cutting and the point of rotation of the cutting arrangement 5 being selected accordingly.

The described arrangement possesses the additional advantage over the usual reception housings that the cleaning thereof is effected extraordinarily quickly and simply.

What I claim is:

1. A method for the granulation of plastic masses comprising extrusion molding of a hot thermoplastic mass in the form of a strand through a conical molding nozzle, cutting the formed strand in predetermined lengths at a cutting station immediately below the molding nozzle as the strand issues from the nozzle while the strand is still warm, disposing a suction stream along an axis which is oblique to the axis of the molding nozzle, propelling a stream of cooling water from an independent source through an atomizer which is spaced from the exit of said molding nozzle and directed into the axis of the suction stream to cool the outer surface of the cut strand and thereby reduce the adhesiveness thereof, applying a vacuum in said suction stream to speed and direct the movement of the cut strands and cooling water to a cooling and collecting station, the speed of flow in said suction stream being sufficient to alter the speed and direction of flow of the cut strands at said cutting station.

2. Apparatus for the granulation of plastic masses comprising a conical molding nozzle for extruding a strand of hot thermoplastic material, pressurizing means for forcing said mass of material in strand form through said molding nozzle, an independent cooling conduit fitted with atomizing head spaced beyond the exit of said molding nozzle for directing cooling water onto the skin of the strand, a rotary cutting knife below the exit of said molding nozzle to cut a predetermined length from said strand, and suction means including a suction nozzle, connecting conduit and cyclone chamber, said suction nozzle being located adjacent the axis of said molding nozzle but obliquely thereto whereby the application of a suction stream speeds the flow of cut strands away from said cutting means in a direction away from said axis of said molding nozzle and cooling of the interior of the cut strands occurs in said cyclone.

References Cited in the file of this patent

UNITED STATES PATENTS

| | | |
|---|---|---|
| 2,436,355 | Cadot et al. | Feb. 17, 1948 |
| 2,539,916 | Ludington et al. | Jan. 30, 1951 |
| 2,653,350 | Piperoux | Sept. 29, 1953 |
| 2,678,466 | Tillotson et al. | May 18, 1954 |
| 2,850,764 | Evans et al. | Sept. 9, 1958 |
| 3,003,193 | Chisholm et al. | Oct. 10, 1961 |